US006611506B1

United States Patent
Huang et al.

(10) Patent No.: US 6,611,506 B1
(45) Date of Patent: Aug. 26, 2003

(54) ENHANCED CHANNEL ALLOCATION AMONG MULTIPLE CARRIERS IN A SPREAD SPECTRUM COMMUNICATIONS SYSTEM

(75) Inventors: Ching Yao Huang, Randolph, NJ (US); Frances Jiang, Whippany, NJ (US); Yuen-Yin L. Koo, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/234,414

(22) Filed: Jan. 21, 1999

(51) Int. Cl.[7] .............................. H04Q 7/00; H04Q 7/20
(52) U.S. Cl. ...................... 370/329; 370/331; 370/332; 455/436; 455/450; 455/453; 455/452
(58) Field of Search ................................. 370/208, 209, 370/328, 329–333, 375, 342; 455/436, 439, 440, 443, 450, 452, 453, 456, 517, 524, 525

(56) References Cited

U.S. PATENT DOCUMENTS

| 5,454,026 A | * | 9/1995 | Tanaka ........................ 455/436 |
| 5,574,973 A | | 11/1996 | Borth et al. |
| 5,666,356 A | | 9/1997 | Fleming et al. |
| 5,673,307 A | * | 9/1997 | Holland et al. .............. 455/436 |
| 5,796,722 A | * | 8/1998 | Kotzin et al. ................ 370/252 |
| 6,069,871 A | * | 5/2000 | Sharma et al. ............... 370/209 |
| 6,075,990 A | * | 6/2000 | Shin ............................ 455/440 |
| 6,128,500 A | * | 10/2000 | Raghavan et al. ........... 455/453 |
| 6,181,943 B1 | * | 1/2001 | Kuo et al. ................... 455/437 |
| 6,188,906 B1 | * | 2/2001 | Lim et al. ................... 455/453 |
| 6,253,087 B1 | * | 6/2001 | Corbett ....................... 455/450 |
| 6,327,472 B1 | * | 12/2001 | Westroos et al. ........... 455/450 |
| 6,393,003 B1 | * | 5/2002 | Lee ............................. 370/331 |

FOREIGN PATENT DOCUMENTS

| DE | 19618947 A1 | 12/1996 |
| EP | 0933955 | 8/1999 |
| WO | 9517077 | 6/1995 |

* cited by examiner

Primary Examiner—Vivian Chin
Assistant Examiner—Duc Nguyen

(57) ABSTRACT

A method for allocating traffic between multiple carriers in a wireless communications system measures loading on the communication system and selects an appropriate carrier from multiple carriers, based upon the loading measured. A first carrier is selected if the load on the first carrier is lower than or equal to the lowest loading of any supplemental carrier among the multiple carriers. If the load on the first carrier is not lower, then the subscriber may be assigned either to a supplemental carrier or the first carrier. The carrier assignment of the subscriber depends upon a predetermined threshold, which preferably considers actual or estimated differential interference between the first carrier and the supplemental carrier.

20 Claims, 7 Drawing Sheets

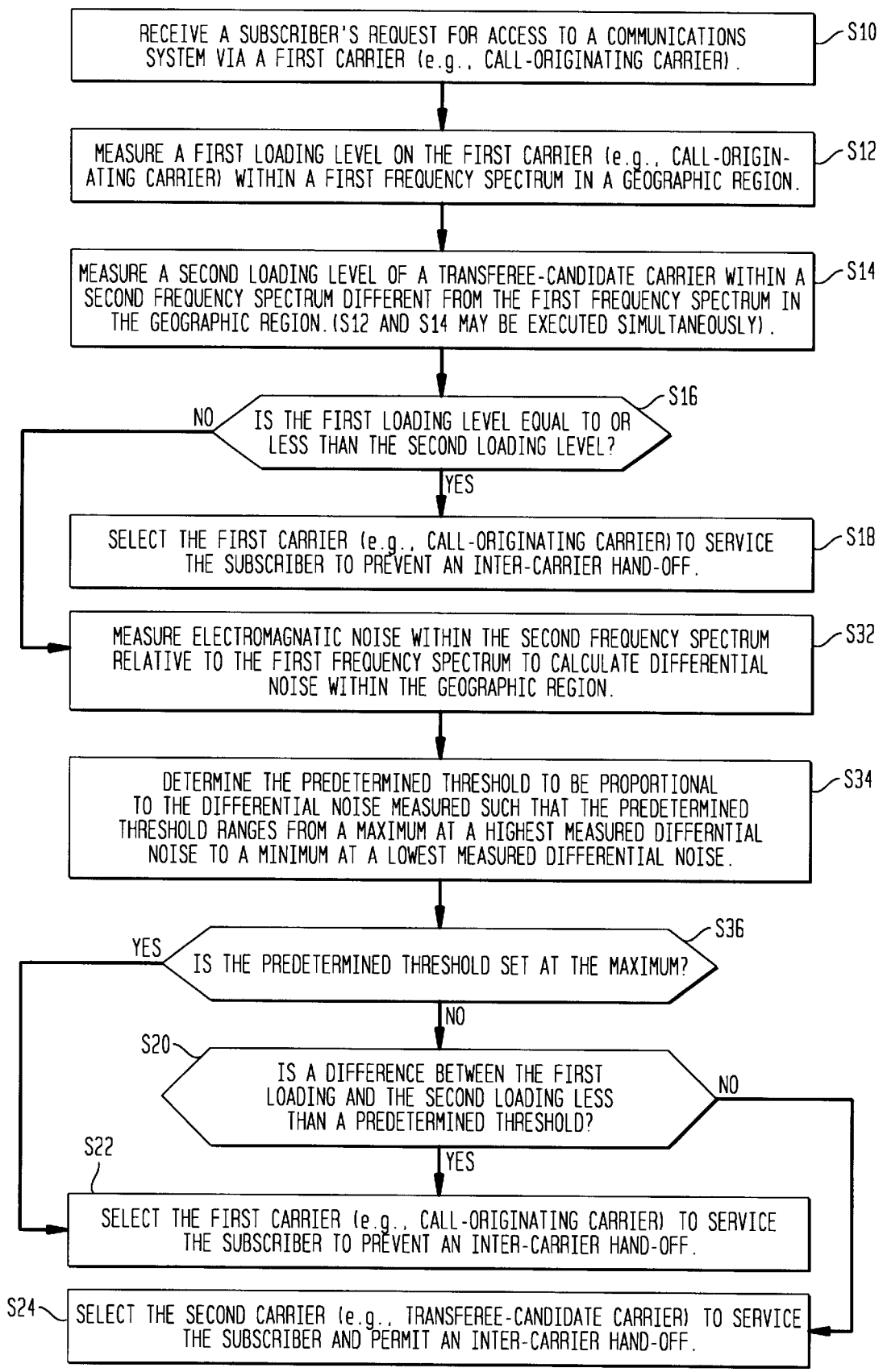

ENHANCED CHANNEL ALLOCATION AMONG MULTIPLE CARRIERS IN A SPREAD SPECTRUM COMMUNICATIONS SYSTEM

FIELD OF THE INVENTION

The present invention relates to spread spectrum communication systems; and more specifically to code-division multiple-access communication systems having multiple carriers serving a common geographic area.

BACKGROUND OF THE INVENTION

Spread spectrum communication systems, such as code division multiple access systems, may use multiple carriers to support traffic requirements of a common geographic area. As used herein, common geographic area refers to a cell site, a sector of a cell site, a cluster of cells, or a cluster of sectors, which is served by more than one radio frequency carrier. Each radio frequency carrier supports multiple traffic channels. Because each subscriber within the common geographic area may be supported by multiple carriers, the communications system must decide how to allocate each subscriber between at least two radio frequency carriers.

One approach used to select a radio frequency carrier for a subscriber entails selection of a carrier with the greatest physical equipment support for traffic channels. For example, a first carrier may have a first level of equipped traffic channels at a cell site serving a subscriber. Meanwhile, a second carrier may have a second level of equipped traffic channels which is greater than the first level. Because the second level of equipped traffic channels exceeds the first level, the communications system transfers the subscriber to the second carrier. However, maximizing the use of the equipment per carrier may lead to unnecessary hand-offs. In the above example, if the first carrier was not fully loaded, no hand-off would be truly mandatory.

Hand-offs between carriers during call-setup may contribute to call setup failures. For instance, call-setup failure may occur because of differential interference of the second carrier with respect to first carrier. The differential interference may contribute to poor reception of downlink or uplink radio frequency signals required to setup or maintain calls. The differential interference may result because adjacent cell sites or surrounding cell sites dynamically add to the background noise and interference about a carrier frequency during movement of mobile subscribers. Even if subscribers are not mobile, as in a wireless local loop (WLL) configuration, traffic variations over time and carrier assignments may influence the interference present at a cell of interest. Accordingly, the first carrier often has a different measurable interference than the second carrier at the cell of interest within a cellular communications system.

Assume for illustrative purposes that the first carrier is a transferring carrier and the second carrier is a transferee carrier. If the second carrier has a higher interference level than the first carrier, the subscriber's transmit power level may be too weak to adequately compensate for the higher interference, impeding reliable transmission on the uplink over the second carrier. Thus, the base station for receiving the second carrier may be unable to receive the traffic channel transmission from the subscriber because of differential interference. The base station may time out waiting for a response or transmission from the subscriber. While power control algorithms for the subscribers can increase power levels to compensate for increased background noise and interference, indiscriminately increasing power during call setup may reduce the overall capacity of the communications system by reducing the signal-to-noise ratio for other subscribers sharing the communications system.

Most code-division multiple-access (CDMA) systems use a soft-hand off for intra-carrier hand-offs, but use a hard-hand off for inter-carrier hand-offs. Intra-carrier hand-offs include hand-offs between adjacent cells, adjacent sectors, other cells, or other sectors that maintain communications over a single carrier on the same frequency spectrum as the subscriber moves throughout the communication system. Inter-carrier hand-offs are hand-offs or transfers between carriers on different frequency spectrums. An inter-carrier hand-off may occur within one cell or one sector, even if the subscriber remains stationary.

Soft hand-offs are considered more reliable than hard hand-offs, because soft-hand-offs use channel resources on a group of cell sites to improve radio frequency coverage reliability. Hard hand-offs provide a somewhat abrupt transition, because the transferring carrier and the transferee carrier generally do not enhance each others radio frequency coverage during a hand-off.

Thus, a need exists for reducing dropped calls and call-setup failures associated with inter-carrier hand-offs and hard hand-offs.

Even if inter-carrier transfers do not contribute to call setup failures, inter-carrier transfers place burdens on the resources of the communication system. Inter-carrier transfers use processing resources of the base station controller. Thus, a need exists for reducing the processing burden of inter-carrier handoffs on the base station controller. Further, a need exists for improving the reliability of communications systems having multiple carriers and using inter-carrier handoffs.

SUMMARY OF THE INVENTION

In accordance with a method of the present invention, a communications system selects a radio frequency carrier for a subscriber based upon a radio frequency loading factor associated with each carrier and a predetermined threshold for evaluating loading factors. The predetermined threshold may be set by an operator of the communications system or automatically by the communications system.

While the predetermined threshold is preferably based on actual measurements of interference on different carriers, the predetermined threshold does not need to be limited to considerations of interference or noise. Accordingly, the predetermined threshold adds flexibility in allocating carriers to subscribers by allowing an operator to define the predetermined threshold based upon any relevant communication system parameters. For example, the predetermined threshold may be defined to represent differential interference measurements, the presence of border cells, the extent of physical equipment per carrier, or any combination of the foregoing communication system parameters. The predetermined threshold advantageously may be further optimized based on traffic conditions or other factors specific or idiosyncratic to individual communications systems.

In a preferred example of the method of the invention, the predetermined threshold is established to prevent inter-carrier handoffs where the interference differential between carriers is likely to cause a call setup failure during an inter-carrier hand-off. Thus, transfers of subscribers are minimized to reduce dropped call rates and other call setup failures. Moreover, the method tends to reduce the use of processing resources of the base station subsystem, including a base station controller, by reducing unnecessary handoffs consistent with an appropriate selection of the predetermined threshold.

BRIEF DESCRIPTION OF THE DRAWINGS

FIG. 6 is a flow chart of a third example of a method for allocating carrier assignments in the communication system in accordance with the invention.

DETAILED DESCRIPTION OF PREFERRED EMBODIMENTS

Figure 1:
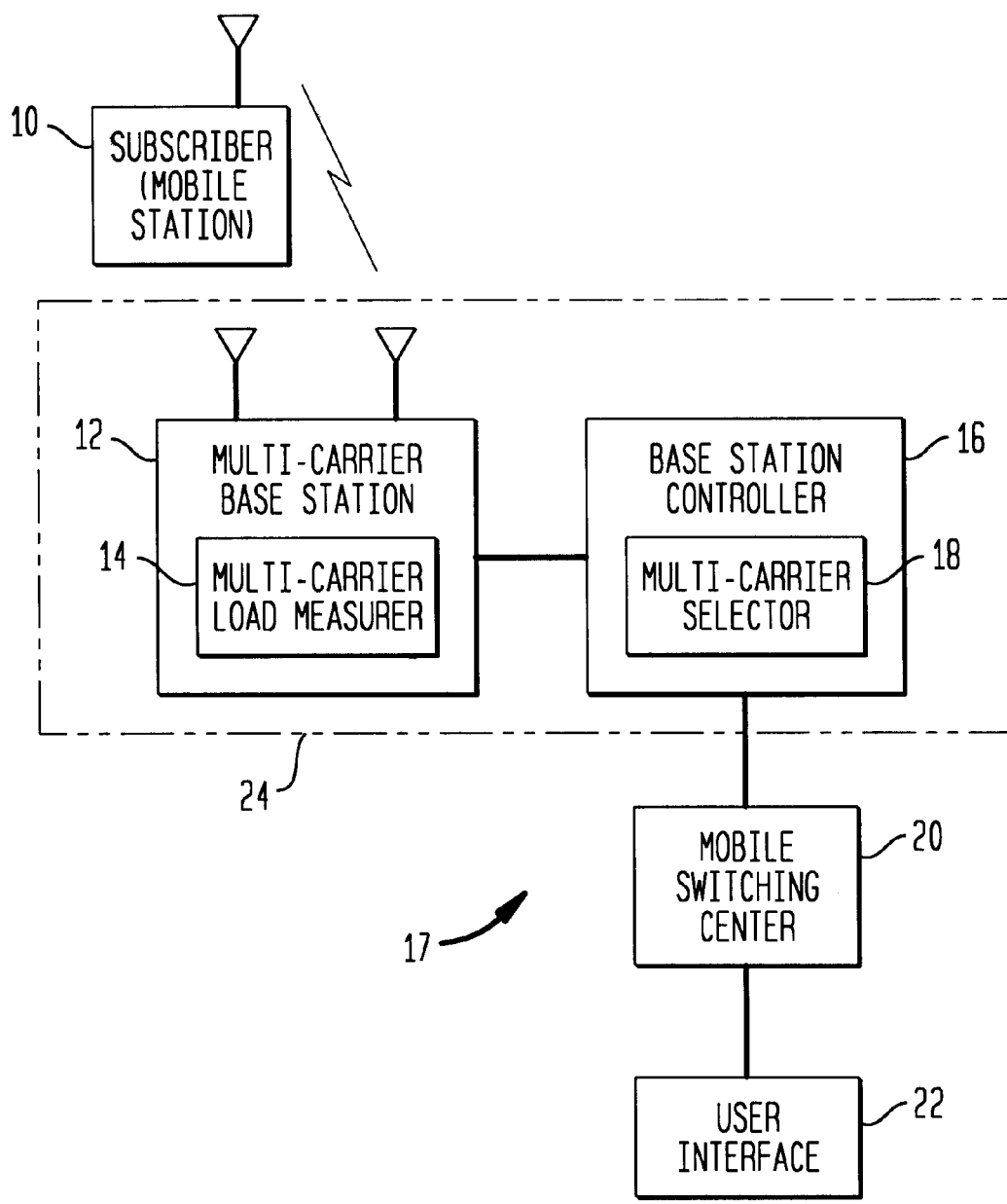
FIG. 1 is a block diagram of a communications system in accordance with the invention.

In accordance with the present invention, FIG. 1 illustrates a communication system for practicing the method of allocating carriers to subscribers on a multi-carrier communications system. The communication system comprises subscriber stations 10 and a fixed end 17. The fixed end 17 preferably includes a base station 12, a base station controller 16 coupled to the base station 12, a mobile switching center 20 coupled to the base station controller 16, and a user interface 22 connected to the mobile switching center 20. A base station subsystem 24 includes the base station 12 and the base station controller 16. The base station subsystem 24 handles processing of a method of the invention in the base station 12, the base station controller 16, or both.

The subscriber stations 10 generally comprise transceivers for radio frequency communication with the base station 12. In a preferred embodiment, the subscriber stations 10 comprise mobile units or any commercially available mobile phones compatible with the fixed end 17.

The base station 12 generally comprises a transceiver for communication with one or more subscribers via radio frequency traffic channels. Each base station 12 preferably supports multiple carriers, although in an alternate embodiment multiple base stations 12 at each site are used to support multiple carriers. Each carrier supports multiple traffic channels. At least one carrier per site or sector has a control channel, a paging channel, an access channel, or another overhead channel to control call setup of the subscribers and activity of the subscribers on the communication system.

A call-originating carrier is any carrier which supports a subscriber's request for access to a communications system. The subscriber initiates a call by communicating over the call-originating carrier to setup the call. After a subscriber's call originates on the call-originating carrier, the communications system decides whether or not to transfer the call to a transferee-candidate carrier. A transferee-candidate carrier supplements the traffic channel capacity of the call-originating carrier. A preferential transferee-candidate carrier refers to a supplemental carrier with the lowest traffic loading among multiple carriers serving a common geographic coverage region.

The base station 12 includes a multi-carrier load measurer 14 for all carriers within the base station 12. The load measurer 14 measures the current downlink power of simultaneous base station transmissions based upon the aggregate of at least all active traffic channels per each carrier. The load measurer 14 optimally measures loading on a generally continuous basis. The load measurer 14 preferably measures power from overhead channels and traffic channels for purposes of the loading per carrier.

Although in a preferred embodiment the multi-carrier load measurer 14 solely measures downlink power, in an alternate embodiment the multi-carrier load measurer measures both downlink power and uplink power. The load measurer may measure the current uplink power associated with subscriber transmissions based upon the aggregate of at least all active traffic channels per each carrier.

The downlink loading or downlink power ratio approximately equals the downlink power used per carrier divided by the downlink power available per carrier. Similarly, the uplink loading or uplink power ratio approximately equals the uplink power used per carrier divided by the uplink power available per carrier. As used herein, loading shall refer to the uplink power ratio, the downlink power ratio, or a mathematical average of both for a single carrier. A first carrier may be characterized by a first uplink power ratio, a first downlink power ratio, or a first average power of uplink and downlink power ratios. A second carrier may be characterized by a second uplink power ratio, a second downlink power ratio, or a second average power of uplink and downlink power ratios.

The base station subsystem 24 preferably estimates or measures downlink power of the base station 12 on a traffic channel at a cell site without requiring a load measurer at the subscriber station 10. However, in an alternate embodiment subscriber stations may include corresponding load measurers for measuring downlink power on a traffic channel which may be periodically transmitted to the base station subsystem 24.

In practice, multiple base stations may be co-located at a single site or multiple sites to meet the capacity requirements of subscriber stations based on the predicted or anticipated subscriber use of the communication system.

The base station controller 16 controls channel assignment activity and access to the communication system. The base station controller 16 may form an integral part of the base station 12, rather than a separate device. The base station controller 16 interfaces the base station 12 to the mobile switching center 20.

The base station controller 16 includes a multi-carrier selector 18 for selecting a corresponding carrier for each valid subscriber requesting access to the communications system. The multi-carrier selector 18 comprises software instructions and the requisite computer hardware.

The computer hardware may include any general purpose computer. For example, the computer hardware preferably includes a processor for allocating carriers to subscribers, a memory for containing the software instructions to accomplish the allocation of the carriers, and a databus for connecting the processor and the memory. In a preferred embodiment, a database is stored on a storage medium coupled to the databus. The database stores values of the predetermined threshold. Also, in a preferred embodiment, each base station 12 has a first predetermined threshold and a second predetermined threshold regardless of which carrier is the call-originating carrier. However, in an alternate embodiment, each carrier is assigned a different predetermined threshold which is active when the carrier acts as the call-originating carrier.

The mobile switching center 20 comprises a mobile switching center 20 or any telecommunications switch for routing, interconnecting, and circuit switching of telecommunication channels. Alternately, the mobile switching center 20 may provide packet switching of the telecommunication channels. The mobile switching center 20 preferably services channel traffic between a telecommunications network (i.e. Public Switched Telephone Network)and the communication system. The mobile switching center 20 includes any telecommunications switch applicable to wireless local loop (WLL) and other applications with stationary subscribers.

The MSC 20 is coupled to a user interface 22. The user interface 22 allows an operator or technician to enter a predetermined threshold, a first predetermined threshold, a second predetermined threshold, or the like. The MSC 20 preferably sends the predetermined threshold information to the base station controller 16 to update the database.

The communications system preferably comprises a digital wireless system, a digital cellular system, a spread-spectrum wireless system, a spread-spectrum wireless local loop system (WLL), a code-division-multiple-access (CDMA) system, or the like.

In accordance with an illustrative example of the invention, a method for allocating traffic between multiple carriers in a wireless communications system measures loading on the communication system and selects an appropriate carrier from multiple carriers, based upon the loading measured. The call-originating carrier is selected if the load on the call-originating carrier is lower than or equal to the lowest loading. If the load on the call-originating carrier is not lower, then the subscriber may be assigned either to another carrier (e.g., supplemental carrier) or the call-originating carrier. The carrier assignment of the subscriber depends upon a predetermined threshold determined, which preferably considers actual or estimated differential interference between the call-originating carrier and the supplemental carrier.

Figure 2:
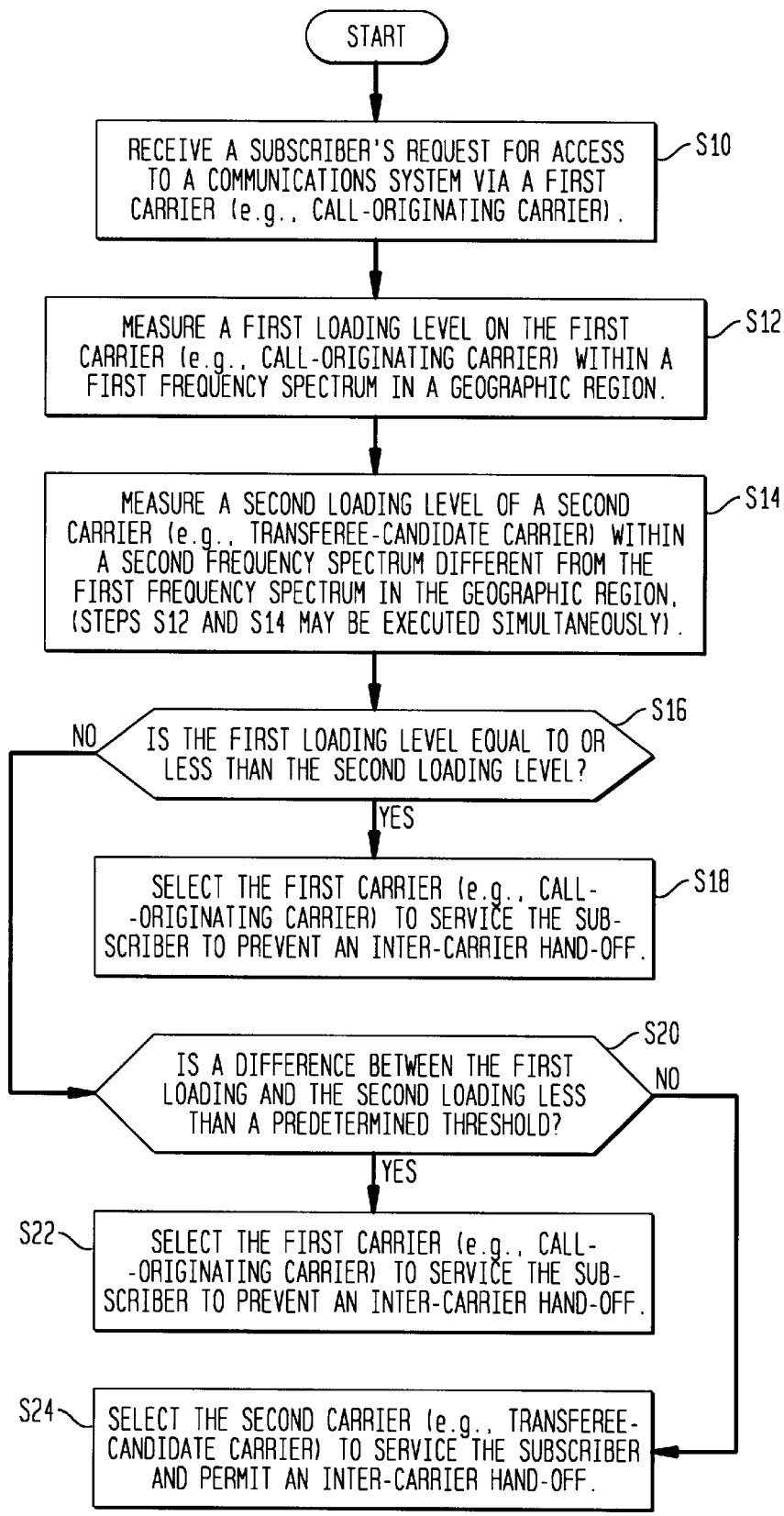
FIG. 2 is a flow chart of a first example of a method for allocating carrier assignments in a communications system in accordance with the invention.

FIG. 2 illustrates a first example of a method for allocating traffic between multiple carriers in a wireless communications system. In step S10 of FIG. 2, once a subscriber requests access to the communication system via a first carrier (e.g., call-originating carrier), the base station subsystem 24 receives the subscriber's request for access to the communications system via the first carrier.

The call-originating carrier generally supports a control channel, an access channel, and a paging channel for controlling traffic and access of subscribers to the communication system. The call originating carrier may also support an overhead channel.

In step S12, the base station subsystem 24 measures a first loading level on the call-originating carrier operating within a first frequency spectrum and serving a first geographic region. In step S14, the base station subsystem 24 measures a second loading level of a transferee-candidate carrier within a second frequency spectrum different from the first frequency spectrum. The transferee-candidate carrier serves a second geographic region, which may be coextensive with the first geographic region. The first geographic region and the second geographic region overlaps in at least one common geographic region in which the subscriber is located.

Although step S12 and step S14 are shown as following step S10 in FIG. 2, step S12 and S14 may take place immediately before or immediately after step S10. Moreover, step S12 and S14 may be executed simultaneously to provide comparable measurements of carrier loading.

Step S16 preferably follows step S14. The base station subsystem 24 in step S16 determines if the first loading level is equal to or less than the second loading level. If the first loading level is equal to or less than the second loading level, the method continues with step S18. In step S18 the base station controller 16 selects the call-originating carrier to service the subscriber and prevents an inter-carrier handoff. Such prevention of the inter-carrier hand-off is consistent with minimizing call setup failures and reducing processing burdens on the base station subsystem 24. However, if the first loading level is greater than the second loading level, the method continues with step S20.

In step S20, the base station subsystem 24 determines if a difference between the first loading and the second loading is less than a predetermined threshold. The determination of the difference may use an absolute value function such that the subtraction does not yield a negative result. If a difference between the first loading and the second loading is less than the predetermined threshold, the method continues with step S22. In step S22 the call-originating carrier is selected to service the subscriber.

An appropriate setting of the predetermined threshold discounts a somewhat higher (although not excessively higher) first loading than the second loading and inhibits an inter-carrier handoff to minimize call setup failures during hard hand-offs. Moreover, processing time and management overhead of the base station subsystem 24 may be decreased by inhibiting inter-carrier hand-offs in accordance with the appropriate setting of the predetermined threshold.

On the other hand the method continues from step S20 to step S24, if a difference between the first loading and the second loading is not less than a predetermined threshold. In step S24 the base station controller 16 selects the transferee-candidate carrier to service the subscriber and permits an inter-carrier hand-off.

The predetermined threshold is preferably determined based upon differential differential interference between the first frequency spectrum and the second frequency spectrum. As used herein, interference refers to the total of electromagnetic signals emanating from at least one geographic region (i.e. surrounding cells or sectors) on a frequency and with a propagational signal strength that affects a perceptible quality (i.e. bit error rate, signal-to-noise ratio, voice intelligibility) of a desired carrier signal emanating within another geographic region (i.e. desired cell or desired sector). In a spread-spectrum system or CDMA system, interference may appear as noise to communication system users because the interference may be from a co-channel spread-spectrum carrier signal coded with a pseudo-random coding sequence or a unique orthogonal coding sequence for each subscriber. In practice, technicians or others may take interference measurements in the field with interference measuring equipment, such as a spectrum analyzer, a bit error rate tester, a receiver, a digital oscilloscope, or the like. Alternately, the base station subsystem 24 may include interference measuring equipment to permit automatic calculation of the predetermined threshold from the measured interference.

The electromagnetic interference within the second frequency spectrum in the common geographic region is measured relative to the first frequency spectrum in the common geographic region to calculate differential interference within the common geographic region. The predetermined threshold is determined to be proportional to the differential interference measured such that the predetermined threshold ranges from a maximum at a highest measured differential interference to a minimum at a lowest measured differential interference. The predetermined threshold is set to prevent allocation of a carrier with significantly strong interference from at least one adjacent or surrounding cell. The operator or communication system user preferably enters the predetermined threshold at a user interface 22 connected to the switching center.

Inter-carrier hand-offs are prohibited between the call-originating carrier and the transferee-candidate carrier if the user sets the predetermined threshold at the maximum setting. However, inter-carrier hand-offs are allowed if the user sets the predetermined threshold below the maximum setting or at the minimum setting.

The first loading level represents radio frequency power usage of active subscribers on the call-originating carrier divided by total radio frequency power available for the call-originating carrier. The second loading level represents radio frequency power usage of active subscribers on the transferee-candidate carrier divided by the total radio frequency power available for the transferee-candidate carrier.

As described in conjunction with FIG. 1, the first loading level may represent a downlink power ratio, an uplink power ratio, or an average of the downlink and uplink power ratio for the call-originating carrier. The maximum power allowable conventionally determines the denominator of the ratio, while the current power usage determines the numerator of the ratio. Similarly, the second loading level may represent a downlink power ratio, an uplink power ratio, or an average of the downlink and uplink power ratio for the transferee-candidate carrier. The first loading level must be comparable to the second loading level in comparisons or equations used in steps of the method. Accordingly, in equations using the first and second loading levels, their downlink power ratios are subtracted or compared, their uplink power ratios are subtracted or compared, or their average power ratios are subtracted or compared, as in step S16 and step S20.

Figure 3:
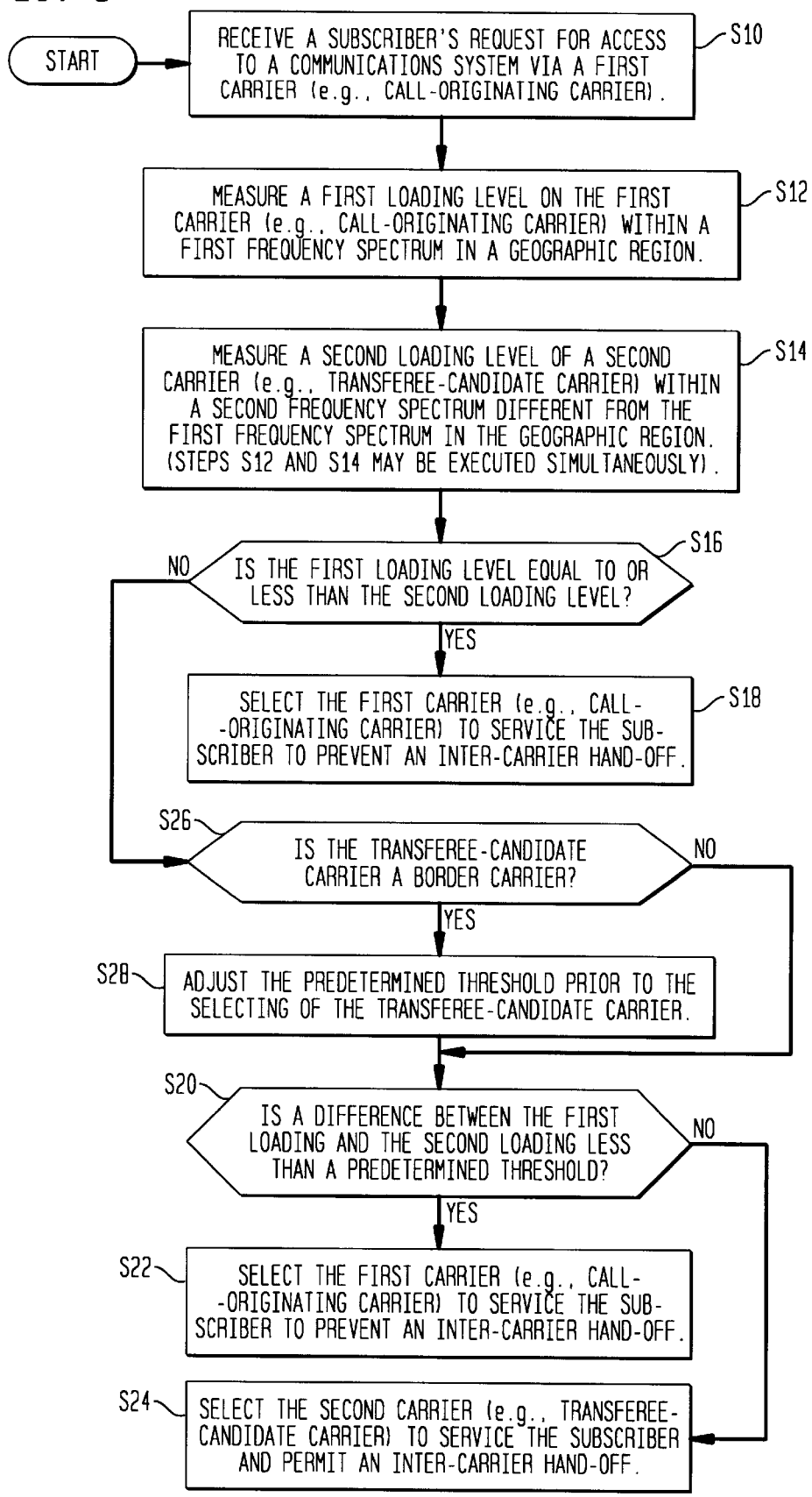
FIG. 3 is a flow chart of a second example of a method for allocating carrier assignments in a communications system in accordance with the invention.

The example of FIG. 3 is similar to FIG. 2, except FIG. 3 includes additional steps S26 and S28. Step 26 follows step S16 if the first loading level is greater than the second loading level. In step S26, the base station subsystem 24 determines whether or not the transferee-candidate carrier is classified as a border carrier. A border carrier is a radio frequency carrier that serves a subscriber station located at an outer periphery of a desired overage area or portion thereof. The outer periphery represents a radio frequency propagation contour of generally constant predicted reliability for serving the subscriber station. To facilitate identification of border carriers, information on cells or carriers may be stored in the database at the base station controller 16 or elsewhere in the communications system. The database is loaded with data indicating the status of carriers as border carriers or normal carriers. Alternately, the database is loaded with data indicating the status of cell sites as umbrella cell sites, omnidirectional cell sites, or sectored cell sites. The database may be stored in the form of a lookup table or as an inverted list for ready retrieval or reference during step S26.

If the transferee-candidate carrier was determined to be a border carrier, then in step S28 the base station subsystem 24 adjusts the predetermined threshold prior to selecting the transferee-candidate carrier. In a preferred example, in step S28 the predetermined threshold precursor is divided by a positive integer greater than one to yield the predetermined threshold for the subsystem in succeeding step S20.

Figure 4:
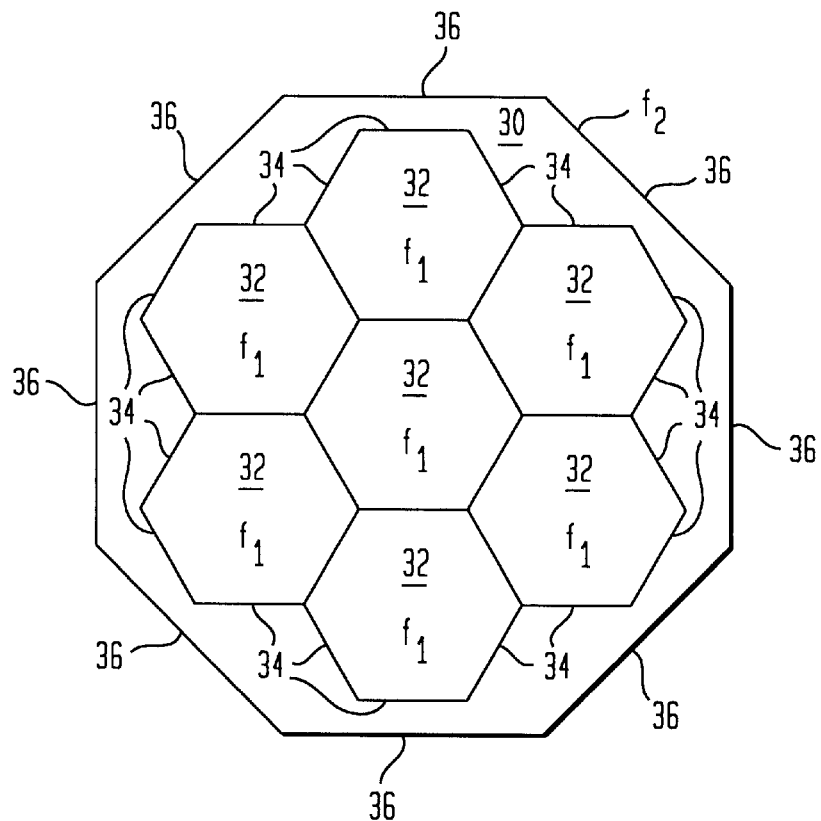
FIG. 4 is a cellular topology diagram of a communications system in accordance with the second example.

As best illustrated in FIG. 4, a border carrier is associated with an umbrella cell 30 on the second frequency spectrum (i.e. f2). The umbrella cell 30 contains or surrounds smaller cells 32 on the first frequency spectrum (f1). The first coverage boundary 34 of the first frequency spectrum is defined by the outer edges of the smaller cells 32, while the second coverage boundary 36 of the second frequency spectrum is defined by a periphery of the umbrella cell 30. Although the umbrella cell 30 surrounds the smaller cells 32 as shown, in alternate embodiments, the coverage of the umbrella cell 30 may be offset from the smaller cells 32 or sectored.

The communications system is preferably configured to exploit the radio frequency coverage advantages of an umbrella cell. Accordingly, cells other than the overhead cells are configured to include an overhead channel selected from the group consisting of a control channel, an access channel, and a paging channel. Meanwhile, the umbrella cell and the border carrier are configured to predominately provide traffic channels rather than the overhead channel.

In general, the predetermined threshold may be determined based upon communication system parameters including differential interference, traffic channel equipment allotment per carrier, border carrier considerations, or any combination of the foregoing parameters.

Figure 5:
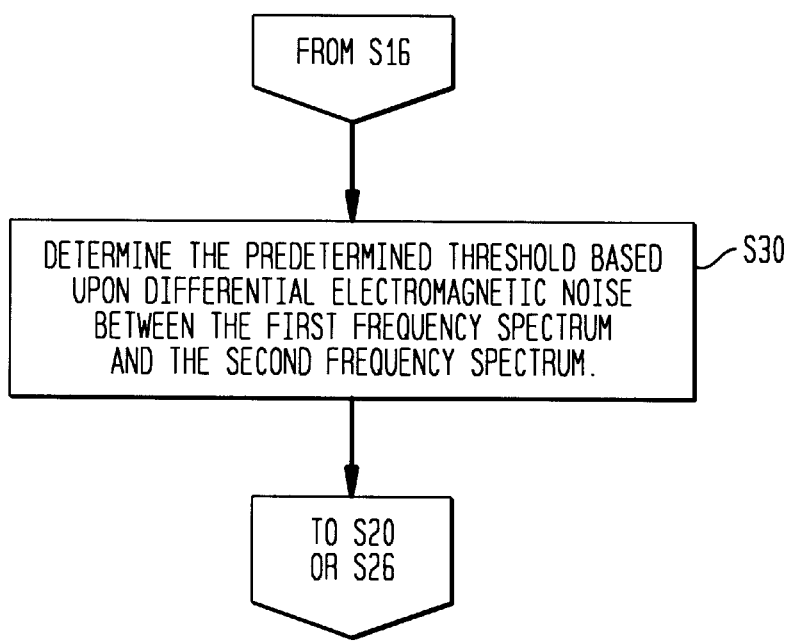
FIG. 5 illustrates an additional step which may supplement the example of FIG. 2 or FIG. 3.

FIG. 5 further defines the predetermined threshold in conjunction with FIG. 2 or FIG. 3. FIG. 5 continues with step S30 after step S16 of FIG. 2 or FIG. 3 if the first loading level is greater than the second loading level. In step S30, the predetermined threshold is determined based upon differential electromagnetic interference between the first frequency spectrum and the second frequency spectrum. Following step S30, the method may continue with step S20 in FIG. 2 or step S26 in FIG. 3.

The success rate of an inter-carrier hand-off may depend upon the different interference levels (or different electromagnetic noise levels) associated with the carriers. For example, a call may fail when the downlink differs from one carrier signal to another carrier signal so that the subscriber does not properly receive data on the paging channel or the control channel. Different interference environments may be present even for carriers in the same sector or cell.

The carriers should be equipped with a sufficient number of traffic channels to support the resultant traffic estimates on the communications system. One channel element (CE) may support one or more traffic channels. The weight factor may be changed to compensate for different or unbalanced distribution of traffic channel equipment between or among the carriers. For example, if a first carrier has twice as many traffic channels as a second carrier, a weight factor may be selected to favor assignments of the subscriber to the first carrier. Accordingly, the predetermined threshold may be determined based upon differential interference and differential equipage between or among multiple carriers.

The actual setting of the predetermined threshold is empirically determined based on factors such as cellular topology, differential interference among carriers, differential equipage among carriers, and desired carrier allocation, among others. The operator preferably selects the predetermined threshold to optimize the allocation of carriers among subscribers to meet the particular conditions or requirements in the field.

In a preferred example, the predetermined threshold is within a range from 0 to 100 percent. The default value for the predetermined threshold is approximately 40 percent. However, the default value may be lowered to approximately 25 percent in certain cases depending upon the cell topology. If the predetermined threshold is set to 100 percent, no inter-carrier hand-off takes place. If the predetermined threshold is set to 0, inter-carrier hand-off takes place if the transferee-candidate carrier has a suitable loading as determined by the comparison to the predetermined threshold.

If the predetermined threshold concerns a border carrier, a second predetermined threshold is set to be less than a first predetermined threshold to favor selecting the supplemental carrier. Where the supplemental carrier is a border carrier, the border carrier tends to have better radio frequency coverage and performance, because adjacent cells on the same frequency are not present or are not spaced as closely together as for the call-originating carrier. Thus, the umbrella cell has minimal or no co-channel interference from surrounding cells. As a result, a high probability exists that the electromagnetic interference level associated with the umbrella cell is lower than for cells associated with the call-originating carrier.

FIG. 6 is similar to the example of FIG. 2, except FIG. 6 includes the additional steps S32, S34, and S36. The additional steps of FIG. 6 further describe an illustrative example of establishing the predetermined threshold.

Step S32 follows step S16 if the first loading level is greater than the second loading level. In step S32, electromagnetic interference is measured within the second frequency spectrum relative to the first frequency spectrum to calculate differential interference within the geographic region, sector, or cellular region of interest. Next, in step S34, a predetermined threshold is established proportionally to the differential interference measured. The predetermined threshold preferably has a range from a maximum at a highest measured differential interference to a minimum at a lowest measured differential interference.

After step S34 in step S36, the base station subsystem 24 determines if the predetermined threshold is set at the maximum. If the predetermined threshold is set at the maximum, the base station controller 16 selects the call-originating carrier to service the subscriber in step S22. If the predetermined threshold is set at the maximum setting, the call-originating carrier services all calls originating thereon. The predetermined threshold may be set in such a manner to represent that the electromagnetic interference on the transferee-candidate carrier is significantly greater than the call-originating carrier. Generally, subsequent corrective action, such as radio frequency optimization, may allow the predetermined threshold to be moved from the maximum setting to improve prospective utilization of the transferee-candidate carrier. If the predetermined threshold is not set at the maximum, the method continues in step S20.

Figure 7A:
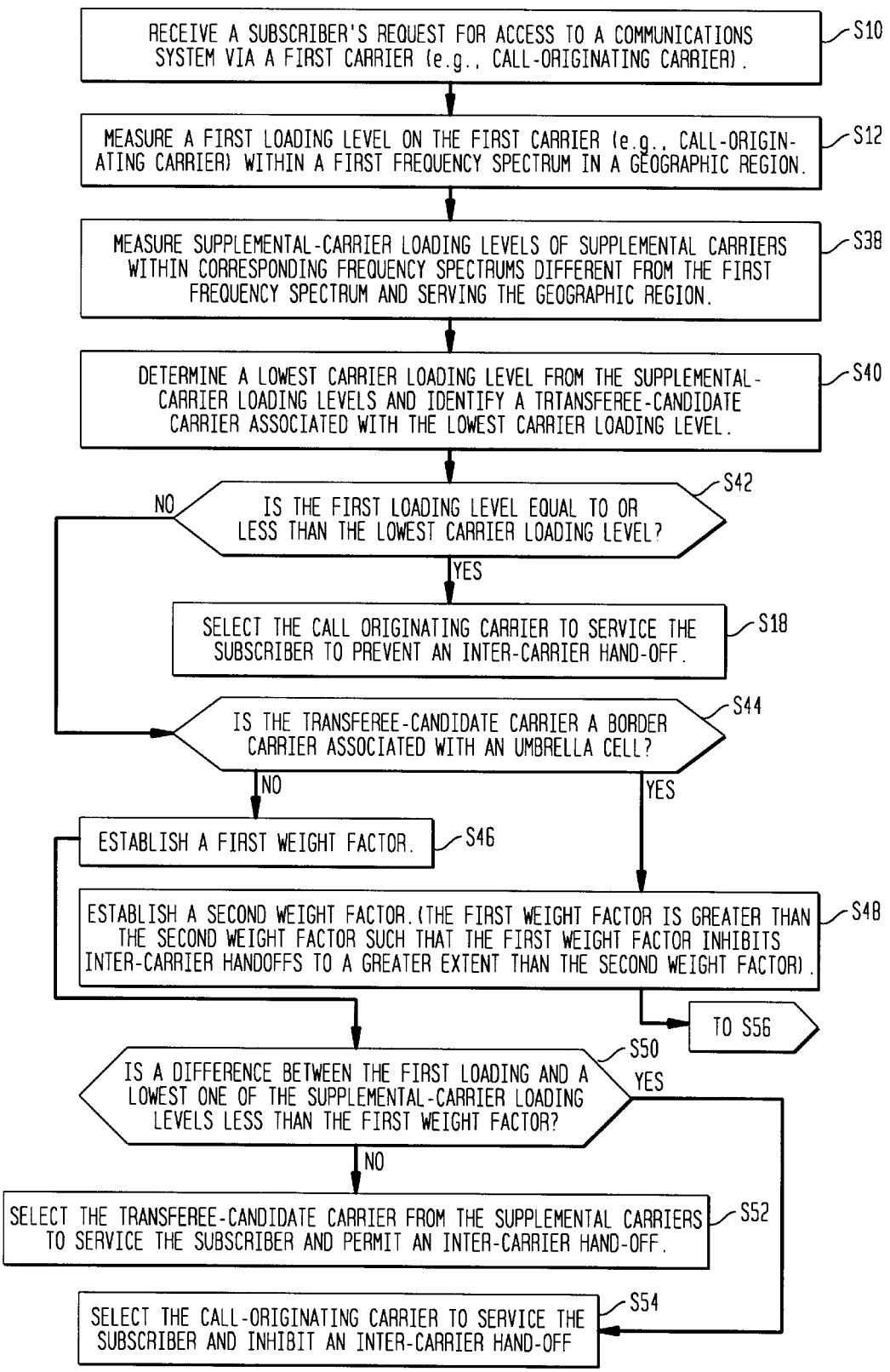
FIG. 7A and FIG. 7B are a flow chart of a fourth example of a method for allocating carrier assignments in the communication system in accordance with the invention.
Figure 7B:
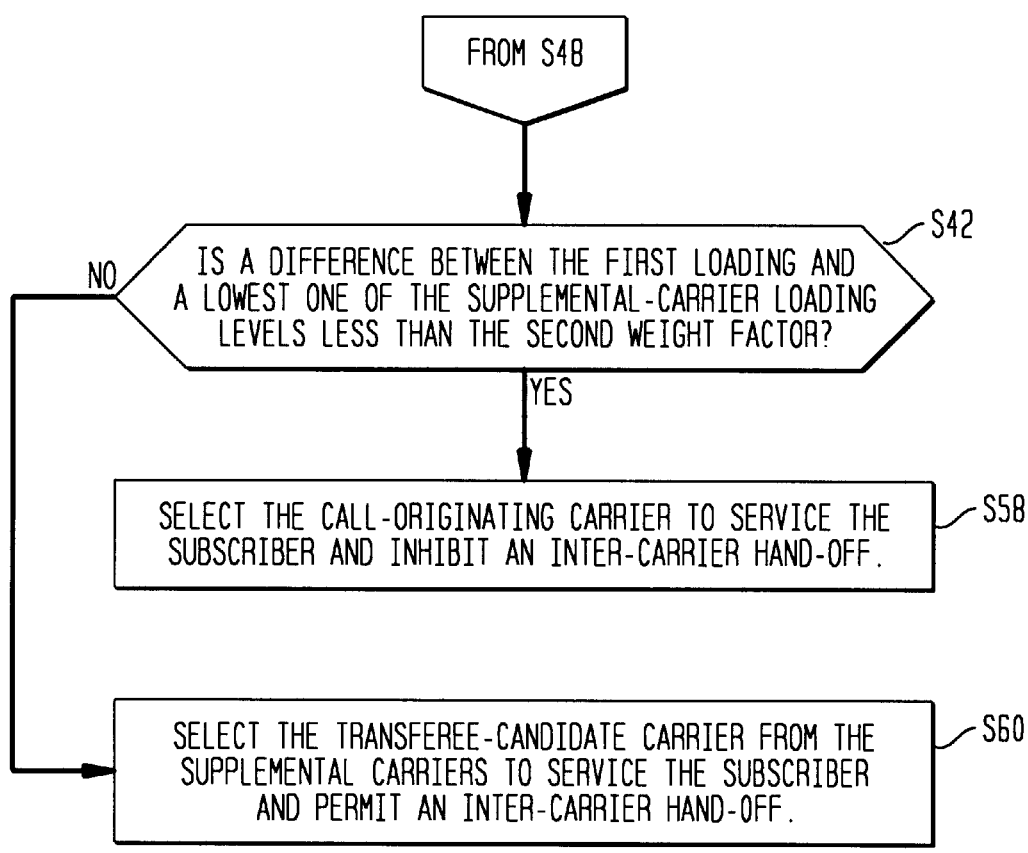

FIG. 7A and FIG. 7B illustrate that the method of the invention may be applied to communication systems or base stations having greater than two carriers. In configurations having two carriers one carrier may be referred to as the call-originating carrier. Carriers other than the call-originating carrier may be designated as supplemental carriers. One of the supplemental carriers may be selected as a transferee-candidate carrier.

In FIG. 7A starting from step S10, once a subscriber requests access to the communication system via a first carrier (e.g., call-originating carrier), the base station subsystem 24 receives the subscriber's request for access to the communications system via the first carrier.

In step S12, a base station subsystem 24 measures a first loading level of a call-originating carrier within a first frequency spectrum in a geographic region. In step S38, a base station subsystem 24 measures supplemental-carrier loading levels of supplemental carriers within corresponding frequency spectrums different from the first frequency spectrum in the geographic region. Step S12 and step S38 may be executed simultaneously to provide comparable loading measurements of the carriers. In step S40, the base station subsystem 24 determines a lowest carrier loading level from the supplemental-carrier loading levels and identifies a transferee-candidate carrier associated with the lowest carrier loading level.

After step S40 in step S42, the base station subsystem 24 determines whether the first loading level is less than or equal to the lowest carrier loading level. If the first loading level is equal to or less than all of the supplemental-carrier loading levels or the lowest carrier loading level of a corresponding available supplemental carrier, the method proceeds to step S18. In step S18, the base station controller 16 selects the call-originating carrier to service the subscriber; hence, prevents an inter-carrier handoff between the call-originating carrier and any one of the supplemental carriers. If the first loading level is greater than the lowest carrier loading level, the method continues at step S44.

In step S44, the base station controller 16 identifies whether or not the transferee-candidate carrier is a border carrier. A border carrier is preferably associated with an umbrella cell containing other cells operating on different frequency ranges than the umbrella cell as previously described in conjunction with FIG. 4. The base station controller 16 may access a database containing data or a field identifying carriers as border carriers or as umbrella cells.

The method continues with step S46, if the transferee-candidate carrier is not a border carrier. In step S46, the communications system establishes a first weight factor. As used herein, establishing a weight factor (e.g., a first weight factor) includes retrieving or accessing a weight factor stored in any storage medium (e.g., memory) associated with the communications system. For example, the operator may enter a first weight factor via the user interface 22 for storage in a storage medium in the mobile switching center 20 or the base station controller 16. The first weight factor is a predetermined threshold generally applicable to non-border carrier conditions. On the other hand, if the transferee-candidate carrier is a border carrier, the method continues with step S48. In step S48, a second weight factor is established. The second weight factor is a predetermined threshold specifically applicable to border carrier conditions. The first weight factor is preferably greater than the second weight factor such that the first weight factor inhibits inter-carrier handoffs to a greater extent than the second weight factor (second predetermined threshold). The second weight factor is more preferably, approximately equal to half first weight factor.

Two general possible outcomes are presented for carrier allocation: (1) The carrier remains on the call-originating carrier without an inter-carrier hand-off; and (2) The carrier is allocated to a transferee-candidate carrier with an inter-carrier hand-off. The outcomes may be reached by alternate routes in the illustrative example of FIG. 7A and FIG. 7B. Each alternate route has a different predetermined threshold.

In accordance with a first route after step S46 in step S50, the base station controller 16 determines if a difference between the first loading and a lowest one of the supplemental-carrier loading levels is less than the first weight factor (i.e. first predetermined threshold). In step S52, the base station controller 16 selects the transferee-candidate carrier from the supplemental carriers to service the subscriber and permits an inter-carrier hand-off, if the difference does not affirmatively satisfy the above equation. However, if the difference satisfies the above equation, the method continues from step S54. In step S54, the call-originating carrier is selected to service the subscriber and inhibit an inter-carrier hand-off.

In accordance with a second route, the method starts from step S56 in FIG. 7B, following step S48 in FIG. 7A. In step S56, the base station controller 16 determines if a difference between the first loading and a lowest one of the supplemental carrier loading levels is less than the second weight factor. If the difference of step S56 is less than the second weight factor, the method continues with step S58. In step S58, the base station controller 16 selects the call-originating carrier to service the subscriber and to inhibit an inter-carrier hand-off. If the difference of step S56 is not less than the second weight factor, the method continues with step S60. In step S60, the base station controller 16 selects the transferee-candidate carrier from the supplemental carriers to service the subscriber and permit an inter-carrier hand-off.

Steps S50, and S56 may involve the following substeps: First, the base station controller 16 calculates a difference between the lowest loaded one of the carriers and a call-originating one carrier. Second, the difference is compared to the first weight factor (step S50) or the second weight factor (step S56). The base station controller 16 permits an inter-carrier hand-off if the difference between the first loading and a lowest one of the supplemental-carrier loading levels is less than the first weight factor in step S50 or the second weight factor in step S56.

In an alternate example of the method, in determining the lowest loaded carrier, the carrier loadings may be sorted or ranked in ascending or descending order to facilitate allocation of a carrier. In another alternate example of the method, if there is not a true umbrella cell but an offset umbrella cell or a quasi-umbrella cell, or another cell which has potentially reduced interference because of spacing between adjacent co-channel cells, an additional state may be added as a intermediate value between the first weight factor and the second weight factor. The additional state is referred to as semi-border carrier and would add an additional route to the example described in FIG. 7A and FIG. 7B.

This specification describes various illustrative examples of the method of the present invention. The scope of the claims are intended to cover various modifications and equivalent arrangements of the illustrative examples disclosed in the specification. Therefore, the following claims should be accorded the reasonably broadest interpretations to cover the modifications, equivalent structures, and features which are consistent with the spirit and scope of the invention disclosed herein.

We claim:

1. A method for allocating traffic between multiple carriers in a wireless communications system, the system including at least a first carrier within a first frequency spectrum and serving a geographic region and a second carrier within a second frequency spectrum different from the first frequency spectrum and serving the geographic region, the method comprising:

determining a threshold based upon differential electromagnetic interference measured within the second frequency spectrum relative to the first frequency spectrum in the geographic region, the threshold ranging from a maximum at a highest measured differential interference to a minimum at a lowest measured differential interference;

prohibiting inter-carrier hand-offs between the first carrier and the second carrier at the maximum; and allowing inter-carrier hand-offs below the maximum.

2. The method according to claim 1, further comprising:

receiving a subscriber's request for access to the communication system via the first carrier;

measuring a first loading level on the first carrier;

measuring a second loading level on the second carrier;

selecting one of the first and second carriers based on at least one of a comparison of the first loading level to the second loading level and on a comparison of a difference between the first and second loading levels to the threshold.

3. The method according to claim 2, wherein said selecting further includes:

selecting the first carrier to service a subscriber if the first loading level is equal to or less than the second loading level to prevent an inter-carrier handoff of the subscriber between the first carrier and the second carrier.

4. The method according to claim 2, wherein said selecting further includes:

selecting the second carrier to service a subscriber; and permitting an inter-carrier hand-off, if the difference between the first loading and the second loading is less than the threshold and the first loading level is greater than the second loading level.

5. The method according to claim 2, wherein said measuring the first and second loading levels further includes:

defining the first loading level as power usage of active subscribers on the first carrier divided by total power available for the first carrier; and defining the second loading level as power usage of active subscribers on the second carrier divided by the total power available for the second carrier.

6. The method according to claim 2, further comprising:

determining whether the second carrier is a border carrier forming at least a portion of an outer periphery of a radio frequency coverage for the subscriber; and adjusting the threshold prior to the selecting of the second carrier if said determining determines that the second carrier is a border carrier.

7. The method according to claim 6, wherein said adjusting further includes decreasing the threshold by at least one-half if said determining determines that the second carrier is a border carrier.

8. The method according to claim 2, further comprising:

determining whether the second carrier is classified as a border carrier being associated with an umbrella cell on the second frequency spectrum containing a plurality of cells on the first frequency spectrum; and dividing a threshold precursor by a positive integer greater than one to yield the threshold for the selection of the second carrier.

9. A method for allocating traffic between multiple carriers in a wireless communications system, the system including at least a call-originating carrier within a first frequency spectrum and serving a geographic region and supplemental carriers within corresponding supplemental frequency spectrums different from the first frequency spectrum and serving the geographic region, the method comprising:

determining a threshold based upon differential electromagnetic interference measured within a supplemental frequency spectrums associated with one of the supplemental carriers relative to the first frequency spectrum in the geographic region, the threshold ranging from a maximum at a highest measured differential interference to a minimum at a lowest measured differential interference;

prohibiting inter-carrier hand-offs between the first carrier and a supplemental carrier at the maximum; and allowing inter-carrier hand-offs below the maximum.

10. The method of claim 9, further comprising:

selecting one of the call-originating carrier and a transferee-candidate carrier from the supplemental carriers based on at least one of a comparison of the first loading level to each of the supplemental-carrier loading levels and on a comparison of a difference between the first loading and a lowest one of the supplemental-carrier loading levels to the threshold.

11. The method of claim 10, wherein said selecting further includes:

selecting the call-originating carrier to service the subscriber if the first loading level is equal to or less than each of the supplemental-carrier loading levels to prevent an inter-carrier handoff between the call-originating carrier and any one of the supplemental carriers.

12. The method of claim 10, wherein said selecting further includes:

selecting the transferee-candidate carrier from the supplemental carriers to service the subscriber; and permitting an inter-carrier hand-off, if a difference between the first loading and a lowest one of the supplemental-carrier loading levels is less than the threshold and the first loading level is greater than each of the supplemental-carrier loading levels.

13. The method according to claim 10, wherein said measuring of first carrier and supplemental-carrier loading levels further include:

defining the first loading level as power usage of active subscribers on the call-originating carrier divided by total power available for the call-originating carrier; and defining each of the supplemental-carrier loading levels as power usage of active subscribers on the corresponding one of the supplemental carriers divided by the total power available for the corresponding supplemental carrier.

14. A method for allocating traffic between multiple carriers in a code division multiple access (CDMA) communications system, the method comprising:

receiving a subscriber's request for access to the communication system via a call-originating carrier;

measuring a first loading level of the call-originating carrier within a first frequency spectrum and serving a geographic region;

measuring supplemental-carrier loading levels of supplemental carriers within corresponding frequency spectrums different from the first frequency spectrum and serving the geographic region;

determining a lowest carrier loading level from the supplemental-carrier loading levels and identifying a transferee-candidate carrier associated with the lowest carrier loading level;

identifying whether or not the transferee-candidate carrier is a border carrier with a radio frequency coverage contour extending outward beyond at least one cell operating on different frequency range than the border carrier; and establishing a first weight factor if the transferee-candidate carrier is a border carrier and establishing a second weight factor if the transferee-candidate carrier is not a border carrier, the first weight factor being greater than the second weight factor such that the first weight factor inhibits inter-carrier handoffs to a greater extent than the second weight factor.

15. The method according to claim 14 further comprising the step of:

selecting the call-originating carrier to service the subscriber if the first loading level is equal to or less than the lowest carrier loading level to prevent an inter-carrier handoff between the call-originating carrier and the supplemental carriers.

16. The method according to claim 14 further comprising the steps of:

identifying whether the border carrier is associated with an umbrella cell containing other cells operating on different frequency ranges than the border carrier;

configuring the other cells to include an overhead channel selected from the group consisting of a control channel, an access channel, and a paging channel; and configuring the border carrier to predominately provide traffic channels rather than the overhead channel.

17. The method according to claim 14 further comprising the step of:

selecting the transferee-candidate carrier from the supplemental carriers to service the subscriber and permitting an inter-carrier hand-off if a difference between the first loading and a lowest one of the supplemental-carrier loading levels is not less than the first weight factor for the transferee-candidate carrier not being a border carrier.

18. The method according to claim 14 further comprising the step of:

selecting the transferee-candidate carrier from the supplemental carriers to service the subscriber and permitting an inter-carrier hand-off if a difference between the first loading and a lowest one of the supplemental-carrier loading levels is not less than a second weight factor for the transferee-candidate carrier being a border carrier.

19. The method according to claim 14 further comprising the step of:

selecting the call-originating carrier to service the subscriber and inhibiting an inter-carrier hand-off if a difference between the first loading and a lowest one of the supplemental-carrier loading levels is less than the first weight factor for the transferee-candidate carrier not being a border carrier.

20. The method according to claim 14 further comprising the step of:

selecting the call-originating carrier to service the subscriber and inhibiting an inter-carrier hand-off if a difference between the first loading and a lowest one of the supplemental-carrier loading levels is less than the second weight factor for the transferee-candidate carrier being a border carrier.

* * * * *